3,390,067
ALKALI-ETCHED, ACRYLATE IRRADIATION-GRAFTED POROUS POLYTETRAFLUORO-ETHYLENE FELT AND METHOD FOR PREPARING SAME
Mary Lucy Miller, New York, and Henry Joseph Fornasar, Brooklyn, N.Y., assignors to American Cyanamid Company, Stamford, Conn., a corporation of Maine
No Drawing. Filed Apr. 21, 1965, Ser. No. 449,873
10 Claims. (Cl. 204—159.17)

The present invention relates to novel surface-treated, wettable, porous polytetrafluoroethylene felting material, which is eminently suitable as a matrix for a variety of fuel cells. More particularly, it relates to alkali-etched, methyl acrylate-grafted, wettable, porous polytetrafluoroethylene felting and to methods for preparing the same.

Commercially available porous polytetrafluoroethylene felt or "Teflon" felting is prepared by matting fibers of polytetrafluoroethylene. The felting is substantially a hydrophobic material which is water-repelling and is thermally and chemically inert to concentrated acid or alkali. If such felting material could be modified so that it can be properly wetted without adversely affecting its desirable inert chemical properties with respect to acids and bases at elevated temperatures, such a material would fill a long-felt need particularly in the matrix fuel cell art which requires the use of chemically inert, wettable, thermally-stable matrix components.

It is, therefore, a principal object of the invention to provide alkali-etched, methyl acrylate-grafted, porous "Teflon" felting which is electrolyte wettable. It is a further object to provide a process for preparing alkali-etched, methyl acrylate, porous, electrolyte-wettable "Teflon" felting. Other objects and advantages will become apparent from a consideration of the ensuing description.

To this end, commercially available "Teflon" felting can be surface modified by subjecting the felting material first to an alkali etching treatment and then by grafting methyl acrylate thereon. These treatments impart to the so-modified felting material electrolyte wettability and high thermal stability. In this manner, matrices have now been made available which perform in fuel cells in a manner hitherto unknown in the fuel cell art.

According to the process of the invention, hydrophobic polytetrafluoroethylene felt is contacted at a temperature ranging from about 50° C. to about —50° C. with an alkali metal in a suitable solvent, such as dioxane, naphthalene, tetrahydrofuran, ammonia or mixtures thereof for a time sufficient to effect surface modification. Alkali etching occurs within about four hours. However, satisfactory etching can occur within about five minutes or less at temperatures of about 50° C. In the event lower temperatures are selected, longer reaction times of at least twenty minutes or more are used.

The alkali-etched felting which has been treated with alkali metal, such as potassium or sodium as disclosed above, is next subjected to polymerization or surface grafting. Methyl acrylate monomer is grafted onto the surface with high energy electrons.

To effect polymerization, methyl acrylate monomer is added to alkali-etched "Teflon" felt and subjected to ionizing radiation by techniques well known in the art. A total dose of from about 1.0 to about 2.5 megrads is required to effect grafting with an attendant increase in weight ranging from 20% to about 40% with accompanying stability.

Subsequent to alkali etching and grafting, the modified "Teflon" felt can be saturated with concentrated acid electrolyte or base electrolyte. Sufficient electrolyte is retained by the so-modified "Teflon" felting, so that it can be employed as an effective matrix.

To further illustrate the invention, the following examples are presented.

Example 1

A 2" x 2" untreated "Teflon" felt is wetted in a suitable vessel with 15 parts of liquid ammonia at between —47° and —52° C. Approximately 1.7 parts to 2.20 parts of potassium are introduced and allowed to contact and react with the "Teflon" for about four hours. The reaction mixture is then terminated by drowning the latter with n-butanol. Finally, the temperature is permitted to rise to room temperature so that ammonia boils off.

The alkali-treated product is next sealed in a polyethylene bag with an equal weight of methyl acrylate monomer under a nitrogen atmosphere. The so-sealed "Teflon" felt is then subjected to radiation with high energy electrons to receive a total dose of 1.5 megrads. Excess monomer and ungrafted polymethyl acrylate are extracted for two hours from the felt with hot ethyl acetate. Resultant grafted product is next hydrolyzed with about 10% aqueous potassium hydroxide and finally is washed free of excess alkali with water. When air-dried, a 23.5% overall weight increase is noted. The increase in weight consists essentially of polymer actually grafted to the "Teflon" felting surface and of polymer cross-linked but trapped in the interstices of the felt. The treated felt is finally contacted at 150° C. with 85% phosphoric acid for forty-eight hours. This treatment removes the cross-linked polymer in the interstices and results in a final gain of 7% in weight due to surface grafting. As an alternative procedure to the latter phosphoric acid treatment, 6 N potassium hydroxide is employed to obtain a substantially similar result.

Example 2

Repeating the procedure of Example 1 in every detail except that the alkali-etched "Teflon" felt prior to grafting is exposed to receive 2.0 megrads of radiation, a weight increase of 40% is noted. However, in a final treatment with concentrated phosphoric acid, removal of cross-linked polymer trapped in the interstices of the treated felt reduces the weight increase from 40% to 20%.

Example 3

This example illustrates the criticality of radiation exposure to effect grafting.

The procedure of Example 1 is followed in every detail except that the alkali-etched "Teflon" felt is exposed to receive 4.0 megrads. A weight increase of 57.2% is found. However, subsequent to the hydrolysis treatment with potassium hydroxide, it is noted that the grafted "Teflon" felt swelled to an extent that the felt structure weakened and tore apart when treated with 85% phosphoric acid.

The stability of various matrix materials for fuel cells at elevated temperatures, the effect of alkali etching per se and the effect of both alkali etching and grafting on electrolyte retention are shown in Tables I, II and III respectively, below.

In Table I below, it will be noted that the surface-treated "Teflon" felt as prepared by the process of the instant invention is stable to at least 150° C. over a prolonged period of time by observing weight loss after three weeks.

TABLE I
[Stability of "Teflon" Felt and Other Materials at 148° C.]

| Material | Electrolyte | Percent Weight Loss in 21 Days |
|---|---|---|
| "Teflon" felt prepared in Example 1 | 85% $H_3PO_4$ | 4.3 |
| "Teflon" felt prepared in Example 2 | 85% $H_3PO_4$ | 4.5 |
| Glass fiber paper | 85% $H_3PO_4$ | (1) |
| Glass fiber cloth | 85% $H_3PO_4$ | (1) |
| "Teflon" felt | 85% $H_3PO_4$ | 2.1 |
| "Teflon" sheet | 85% $H_3PO_4$ | 0.4 |

1 Decomposed.

Thus, it will be seen that fiber glass paper and fiber glass cloth which are wettable are thermally unstable, whereas the untreated hydrophobic "Teflon" and the treated or modified "Teflon" felt exhibit good thermal stability.

In Table II following there is illustrated the effect of alkali etching when conditioned with electrolyte. This table summarizes data which demonstrates that as much as a 200% increase in electrolyte retention is obtained after 300 minutes of ageing or conditioning by exposure to an alkali-etching treatment.

TABLE II

[Effect of Surface Etching on Electrolyte Solution Retention by "Teflon" Felt]

| Length of Treatment, Minutes | Electrolyte Solution absorbed by Etched "Teflon" | Amount of Electrolyte absorbed per Square Inch of Felt (in ml.) | Percent Increase of Electrolyte Pick-up |
|---|---|---|---|
| 0 | KOH [1] | 0.17 | |
| 0 | $H_3PO_4$ [2] | 0.17 | |
| 20 | KOH | 0.18 | |
| 90 | KOH | 0.39 | 30 |
| 90 | $H_3PO_4$ | 0.40 | 30 |
| 180 | KOH | 0.56 | 130 |
| 180 | $H_3PO_4$ | 0.40 | 130 |
| 300 | KOH | 0.65 | 200 |
| 300 | $H_3PO_4$ | 0.69 | 206 |

[1] 6 N KOH.
[2] 85% $H_3PO_4$.

In Table III below, there is shown in comparison the final amount of electrolyte solution retained. Little or no difference in electrolyte absorption is noted when the products of Examples 1 and 2 are subjected to a final acid treatment or even after prolonged ageing for 750 hours at 150° C. The stability and thermal inertness of the products of the present invention are advantageously obtained.

Advantageously, the modified "Teflon" felt of the invention is particularly useful as a fuel cell matrix due to its thermal and chemical stability. Temperatures as high as 150° C. or even higher do not adversely affect its utilization over a relatively prolonged time period.

We claim:

1. A surface-treated, alkali-etched, methyl acrylate irradiation-grafted, wettable and porous polytetrafluoroethylene felt.

2. A surface-treated, alkali-etched, methyl acrylate irradiation-grafted, electrolyte wetted and porous polytetrafluoroethylene felt.

3. The surface-treated felt of claim 2 wherein the electrolyte is concentrated phosphoric acid.

4. The surface-treated felt of claim 2 wherein the electrolyte is potassium hydroxide.

5. A process for surface modifying polytetrafluoroethylene felt which comprises: contacting polytetrafluoroethylene felt with a solution of an alkali selected from the group consisting of sodium and potassium; subjecting the latter alkali-etched felt to ionizing radiation in the presence of methyl acrylate monomer to a total radiation dose between about 1.0 megrad to 2.5 megrads and hydrolyzing the so-alkali etched and grafted felt to recover a wettable and porous polytetrafluoroethylene felting material.

6. The process of claim 5 wherein etching of the felt surface is carried out in the presence of liquid ammonia at a temperature below about −40° C.

7. The process of claim 6 wherein the alkali is potassium.

8. The process of claim 6 wherein the alkali is sodium.

9. The process of claim 5 wherein the etched and methyl acrylate-grafted felt is hydrolyzed by means of an aqueous dilute solution of potassium hydroxide.

10. The process of claim 9 wherein the hydrolyzed modified felt is wetted with 85% phosphoric acid.

TABLE III

["Teflon" Felt Grafted under Different Conditions with Methyl Acrylate]

| Various Treatments of Felt | Example 1 | | Example 2 | | Ratio of Final to Initial Electrolyte Retention |
|---|---|---|---|---|---|
| | Percent Weight Increase of Felt | ml./in.² of 85% $H_3PO_4$ Retained | Percent Weight Increase of Felt | ml./in.² of 85% $H_3PO_4$ Retained | |
| (A): is Alkali-etched, grafted "Teflon" absent phosphoric acid treatment | 23.5 | 1.46 | 40 | 1.67 | 9.3 |
| (B): is (A) above coupled with preliminary 85% phosphoric acid treatment | 7.1 | 1.40 | 20 | 1.41 | 7.8 |
| (C): is (B) above coupled with 750 hrs. ageing at 150° C. in 85% phosphoric acid | 6.9 | 1.40 | 19 | 1.40 | 7.8 |

References Cited

UNITED STATES PATENTS 3,101,275  8/1963  Cairns et al. _____ 204—159.2
3,167,491  1/1965  Harrison _____ 117—47

MURRAY TILLMAN, *Primary Examiner.*

R. B. TURER, *Assistant Examiner.*